United States Patent [19]

Benoit

[11] 4,130,034

[45] Dec. 19, 1978

[54] PORTABLE REFACING MACHINE

[76] Inventor: Lloyd F. Benoit, Rt. 1, Box 57B, Arnaudville, La. 70512

[21] Appl. No.: 808,053

[22] Filed: Jun. 20, 1977

[51] Int. Cl.² ............................................. B23B 3/34
[52] U.S. Cl. .................................................. 82/4 C
[58] Field of Search ...................... 82/4 C, 4 R; 30/97

[56] References Cited

U.S. PATENT DOCUMENTS

| | | | |
|---|---|---|---|
| 612,743 | 10/1898 | Maier | 82/4 R |
| 1,115,277 | 10/1914 | Bodkin | 82/4 C X |
| 1,823,959 | 9/1931 | Steinmayer | 82/4 C X |
| 1,985,541 | 12/1934 | Hoefer | 82/4 C X |
| 2,271,582 | 2/1942 | Dixon | 82/4 C X |
| 2,634,643 | 4/1953 | Krooss | 82/4 C |
| 2,769,234 | 11/1956 | Young | 82/4 C X |
| 3,367,219 | 2/1968 | Walters | 82/4 C |
| 3,744,356 | 7/1973 | Slator et al. | 82/4 C |
| 3,813,968 | 6/1974 | Thomas | 82/4 C |

Primary Examiner—Harrison L. Hinson
Attorney, Agent, or Firm—C. Emmett Pugh & Associates

[57] ABSTRACT

A portable apparatus for refacing either pin or box portions of damaged pipe sections on site including a housing, a set of truing up plates mounted on the housing for initially positioning the damaged pipe sections inside the apparatus, a set of jaws mounted on the housing and provided with movable elements for adjustably securing the surface of the pipe section, a ring gear rotatably mounted on the housing, and resurfacing tools provided on the rotatable ring gear. An associated gearing mechanism tracks the resurfacing tool toward and away from the center of the pipe section as the ring gear is rotated by an attached conventional power source.

Alternative gauging arms are provided for initially positioning the damaged pipe section inside the apparatus.

3 Claims, 10 Drawing Figures

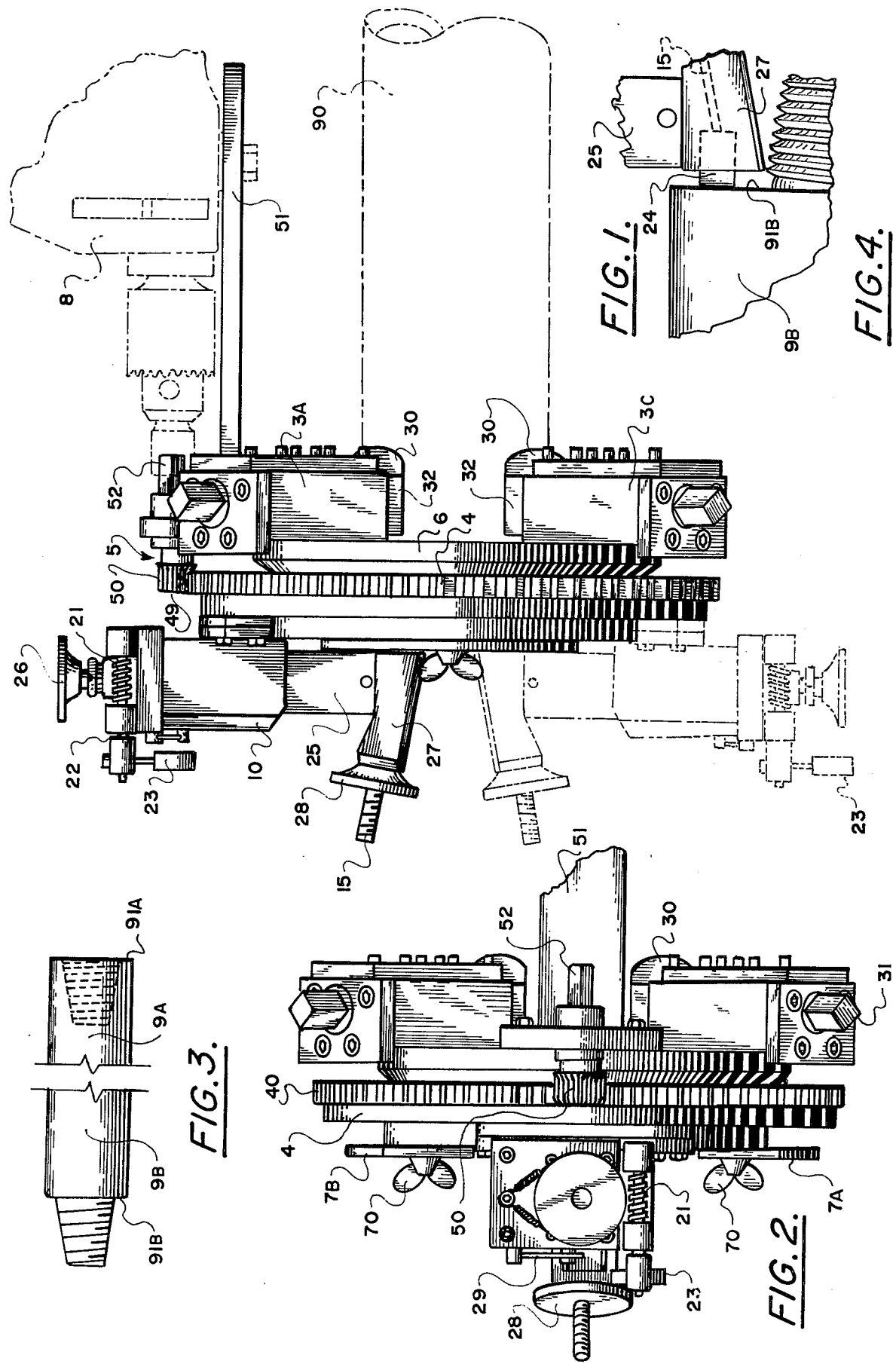

PORTABLE REFACING MACHINE

BACKGROUND OF THE INVENTION

1. Field of the Invention

This invention relates to the repair of damaged pipe joints, and in particular to a portable apparatus for refacing of drill pipe section joints and the like on site.

2. General Background

The invention will be described with reference to the refacing of drill pipe section joints, but it will be understood that its application extends to the refacing of any type of pipe sections and any type of joints, such as for example, metal flanges.

Drill pipe sections have to be removed and refaced in the course of drilling operations due to the fact that abrasive fluids, often under high pressures, cause considerable wear and damage to the pipe section joints. Also, the frictional contact during make-ups and additions to the drill string is a contributing factor in causing damage to the joint and, in particular, to the joint shoulders. Since damaged joints will leak, whole sections have to be removed and refaced to ensure that all pipe sections in the string have even joints and mate properly.

For years, the conventional method of refacing a drill pipe joint was to send the damaged pipe section to a machine shop to be reworked by means of a lathe and, often, rethreaded at the same time. Since this was a time consuming operation and since very often no rethreading was necessary, portable refacing machines were developed in more recent years which are easier to transport to the rig site and which are specifically designed to do the refacing job. Descriptions of some of these portable machines which have been patented are listed in the following table:

PRIOR ART

| U.S. PAT. NO. | INVENTOR(S) | ISSUE DATE |
| --- | --- | --- |
| 2,811,903 | C. B. Harmes | 11-05-57 |
| 2,842,238 | A. W. Shaw, et al | 7-08-58 |
| 2,889,721 | R. G. Coleman | 6-09-59 |
| 2,900,858 | R. P. Gauthier, et al | 8-25-59 |
| 3,067,651 | J. D. Hogden, et al | 12-11-62 |
| 3,103,676 | W. J. Kehaly | 9-17-63 |
| 3,124,024 | M. L. Pittman | 3-10-64 |
| 3,141,365 | J. B. Peters | 7-21-64 |
| 3,164,062 | J. D. Hodgen, et al | 1-05-65 |
| 3,181,398 | J. M. Rogers | 5-04-65 |
| 3,273,432 | J. Hasund | 9-20-66 |
| 3,540,329 | J. B. Gill | 11-17-70 |
| 3,561,302 | H. N. Keener | 2-09-71 |
| 3,608,406 | J. R. Paysinger, et al | 9-28-71 |
| 3,630,109 | Harry T. MacMichael, et al | 12-28-71 |
| 3,247,743 | R. B. Frost, et al | 4-26-66 |
| 3,650,514 | Gerald A. Stunkard | 3-21-72 |
| 3,691,882 | D. L. Massey | 9-19-72 |
| 3,717,055 | E. M. Pendleton | 2-20-73 |
| 3,733,939 | Paysinger, et al | 5-22-73 |
| 3,744,356 | Damon T. Slator, et al | 7-10-73 |
| 3,748,933 | J. C. DeShazor | 7-31-73 |
| 3,772,944 | A. F. Becker, et al | 11-20-73 |
| 3,807,047 | C. R. Sherer, et al | 4-30-74 |
| 3,813,968 | Robert Thomas | 6-4-64 |
| 3,817,649 | Jonas Medney | 6-18-74 |
| 3,835,738 | J. B. Kellum, et al | 9-17-74 |

While the portable feature of these machines represents an advance in the art and adds to their versatility, they still suffer from one or more of several disadvantages. For example, the machine of Rogers uses a mechanism for engaging itself to the pipe section to be refaced which depends on a threaded screw member arranged to mate with the screw thread of the pipe joint. This arrangement, while satisfactory for some purposes, has the disadvantage that the pitch and size of threads of the screw member has to match the pitch and size of threads of the pipe section joint, and thus various adapters are needed to fit the various male or female joints to be refaced. The machine of Massey also has the disadvantage of necessitating internal threads for aligning the refacing tool with the axis of the threaded tool joint, and this significantly limits the range of pipe diameters which can be handled by the apparatus. The machine of Pittman also depends on this type of adaptor, as do the machine and method of Keener. In addition, some of these recently developed devices, while essentially portable, are often heavy and bulky, and are hard to be transport, and frequently require that the whole pipe section to be refaced be turned as its shoulders are worked on. Also, these devices are not always capable of simultaneously refacing more than one surface, or when they are capable, as in the case of the machine of Pendleton, they depend on a plurality of cutting elements of various shapes and designs, to do the job. The machine of Pendleton also suffers from the disadvantage of having to depend on a tapered thread adaptor for mating with the standard male and female pipe joints.

GENERAL DISCUSSION OF INVENTION

It is therefore an object of the present invention to provide an apparatus for refacing pipe section joints, and the like, that is portable and easy to transport and that, at the same time, does not suffer from the various disadvantages associated with the prior art machines and methods with which the inventor is familiar.

Another object of the present invention is to provide an apparatus for refacing pipe joints that does not depend on the use of threaded adaptors, and the like, for securing the proper engagement of the pipe joints to be refaced with the apparatus.

A more particular object of the present invention is to provide an inexpensive, lightweight, portable apparatus for refacing drill pipe section joints which is capable of doing the refacing job without regard to the exact size and condition of the threads of the pipe joints to be refaced and without regard to the exact diameter of the pipe joints.

It is a further object of the present invention to provide an apparatus for refacing pipe joints that can accommodate even those pipe sections which, for any number of reasons, have been slightly deformed and which therefore do not exhibit a perfectly round opening at their joints.

It is still another object of the present invention to provide a refacing machine that does not require that the pipe sections to be refaced be rotated, and that does not require that a plurality of cutting elements be used to do the refacing job.

The above objects are accomplished by the preferred embodiment of the apparatus of the present invention. This apparatus includes a support housing; a set of truing up plates mounted on the support housing for positioning the pipe sections inside the apparatus; a set of jaws, also mounted on the housing, and provided with movable elements for detachably securing the surface of the pipe sections to be refaced; a ring gear which is rotatably mounted on the housing; and resurfacing tools. Resurfacing tools can be connected to the ring gear by means of a mechanism that allows the tool to move toward and away from the center of the pipe sections as the ring gear rotates. The rotational movement of the ring gear is accomplished by a drive gear and a shaft which are driven by, for example, an electric motor. The truing up plates enable the positioning of the pipe joint shoulders to be refaced with respect to the plane of the cutting head face. The set of jaws enables an operator to engage the machine to the pipe sections to be worked on without the need of threaded adaptors.

BRIEF DESCRIPTION OF THE DRAWINGS

For further understanding of the nature and objects of the present invention, reference should be had to the following detailed description, taken in conjunction with the accompanying drawings, and in which like parts are given like reference numerals and wherein:

FIG. 1 is a side elevational view of the preferred embodiment the present invention in position refacing a shoulder of the box (female) end of a pipe section joint;

FIG. 2 is a top view of the preferred embodiment of the apparatus of the present invention showing part of the cutting head engaging mechanism;

FIG. 3 is a fragmentary view of a typical drill pipe section showing a pin (male) end and a box (female) end;

FIG. 4 is a fragmentary view of the cutting head and cutting element of the preferred embodiment of the apparatus of the present invention in position for refacing the shoulder portion of a pin (male) end of a pipe section joint;

DETAILED DESCRIPTION OF THE PREFERRED EMBODIMENTS

STRUCTURE

Figure 6:
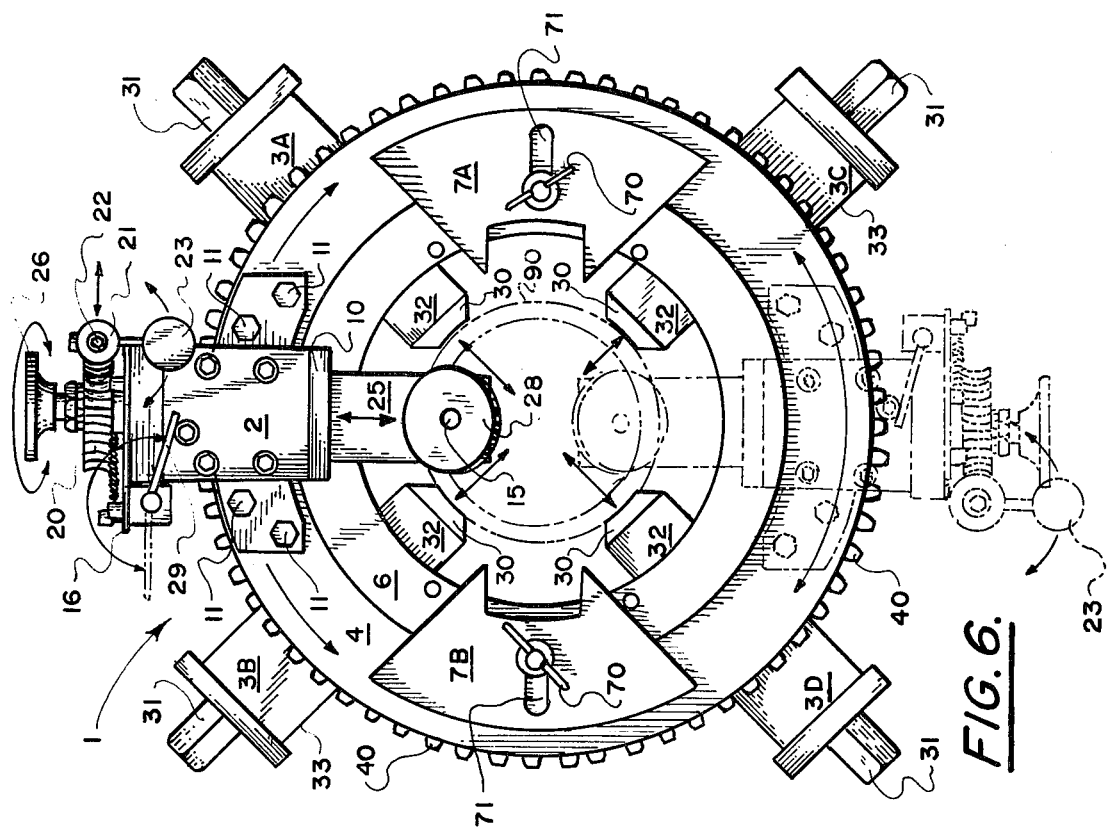
FIG. 6 is a front view of the preferred embodiment of the apparatus of the present invention with the refacing tool attached.
Figure 5:
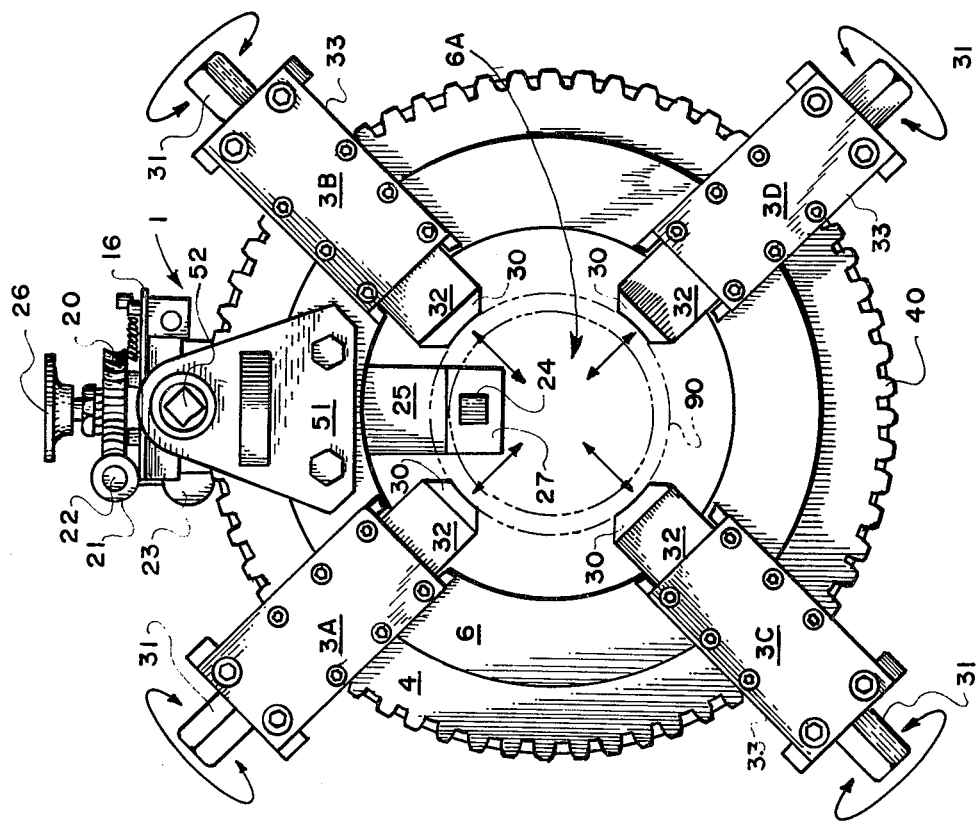
FIG. 5 is a rear view of the preferred embodiment of the apparatus of the present invention.

In order to more completely describe the preferred embodiment of the invention, reference may be made to the embodiment illustrated in FIGS. 1–6. As can best be seen by FIGS. 1, 2, 5, 6, and 7, reference numeral 1 generally indicates the apparatus of the present invention, which is generally comprised of housing 6, ring gear 4, jaws 3A–3D and tools 2–2A. Housing 6 is desirably cylindrical but may take any shape or configuration so long as it can effectively support the attached remaining components of the apparatus. Central aperature 6A is provided in housing 6. Aperature 6A has a preferred diameter large enough to accomodate desired pipe diameters. Ring gear 4 is provided with teeth 40, and is rotatably mounted on housing 6. Rotation of ring gear 4 with respect to housing 6 may be on a surface-to-surface basis with conventional lubrication between the two surfaces. Alternatively, ball bearings (not shown) may be provided on housing 6 to allow ring gear to rotate freely thereon. Ring gear 4 is preferably able to rotate in either direction, that is, clockwise or counterclockwise. Ring gear 4 is preferably cylindrical having an internal diameter substantially identical to the outside diameter of housing 6. Ring gear teeth 40 engage means 5 for imparting rotational movement to ring gear 4. Means 5 for imparting rotational movement to ring gear 4 is preferably comprised of drive gear 50, drive gear shaft 52, and power supply 8. Drive gear 50 is provided with teeth 49 for engaging drive gear shaft 52. Drive shaft 52 rotatably drives the drive gear 50 and is driven by a source of power 8 which can be, for example, an electric motor. When an electric motor is used as power supply 8, a reversible type drill is preferred. Brackets 51 for supporting power supply 8 may be provided if needed for rigidity. The reversible drill type of motor can impart rotational movement to the ring gear in either direction.

Refacing tool 2 and beveling tool 2A are mounted on rotatable ring gear 4. The central axis' of both tools 2, 2A are oriented perpendicular to ring gear 4.

The cutting head 27 of refacing tool 2 of the preferred embodiment is connected to ring gear 4 by a mechanism that allows the head to move toward and away from the longitudinal axis of a pipe section joint when said section joint is secured into the apparatus, as described hereinbelow. The cutting head may be of any shape and configuration, although in the preferred embodiment it takes the shape of a rectangular block. It may also take the shape of a cylindrical block. At one end of the block there is provided at least one cutting element. FIG. 4 shows a fragmentary view of the cutting head 27 with one cutting element 24 on its end face in position for refacing the shoulder 91B of a joint pin end 9B. The cutting element 24 may be telescopically mounted on cutting head 27 by means of a threaded shaft 15 which is housed inside the cutting head 27, and which is movable within said head block by means of adjusting knob 28. The purpose of this type of mounting is to facilitate lateral positioning of the cutting face of the cutting element 24 with respect to the face 92b of the shoulder to be refaced. Alternatively, a spring-type or similar mechanism may be provided, instead of the telescopic mounting, whenever means are desired for allowing an operator to adjust the lateral movement of the cutting element face with respect to the shoulder to be worked on indenepdently or, and in addition to, the positioning of the pipe joint inside the apparatus by means of the truing up gears, as described hereinbelow.

The mechanism by which the tools 2, 2A are connected to the ring gear 4 is illustrated in FIGS. 1, 2, 5, 6, and 7. Cutting head 27 is attached to head vertical adjusting member 25, which is telescopically mounted within head holder 10. Head holder 10 may take the form of a casing with a hollow inner portion within which head vertical adjustment member 25 may move toward and away from the longitudinal axis of the pipe section joint once the joint is secured as explained below. Head holder 10 is attached, e.g., bolted or welded to ring gear 4. Preferably it is bolted to ring gear 4 using a plurality of bolts 11. The end of the head vertical adjustment member 25 which is not attached to cutting head 27 is engaged to vertical control gear 20 by a mechanism which causes head vertical control member 25 to move perpendicularly to the plane of vertical control gear 20 as vertical control gear 20 rotates. Such mechanism may take the form of, for example, a threaded shaft, around which gear 20 rotates, and a set of spring-mounted plates connected to gear 20 on one end and to vertical control member 25 on the other end, or any other of a number of known mechanisms for translating the rotational motion of a gear into a linear motion of a member connected to such a gear. The teeth of vertical control gear 20 are engaged to worm gear 21. The threads of worm gear 21 are movable along the plane of the gear's drive shaft 22 in either direction, so that when drive shaft 22 rotates clockwise the threads move in one direction, and when the shaft rotates counterclockwise the threads move in the opposite direction. Drive weight 23 is rotatably connected to the drive shaft 22 of worm gear 21 so that, as ring gear 4 rotates in either direction, the gravitational force causes drive weight 23 to remain perpendicular to the ground. This in turn causes worm gear drive shaft 22 to rotate with respect to vertical control gear 20, which rotation causes vertical control gear 20 to rotate. As vertical control gear 20 rotates in one direction, head vertical adjustment member 25 moves either toward or away from the longitudinal axis of the pipe section, depending on the direction of rotation of gear 20. For example, gear 20 and vertical adjustment member 25 may be engaged so that vertical adjustment member 25 moves toward said longitudinal axis as gear 20 rotates clockwise and away from said longitudinal axis as gear 20 rotates counterclockwise, or vice versa.

Also connected to the end of head vertical adjustment member 25 which is not attached to cutting head 27 is a head vertical adjustment knob 26. Head vertical adjustment knob 26 is engaged to vertical adjustment member 25 by a mechanism similar to that which engages gear 20 to vertical adjustment member 25 and, in fact, the mechanism may make use of the same shaft and same set of spring-mounted plates used to engage the latter two components. The mechanism for engaging knob 26 to vertical adjustment member 25, however, preferably acts independently from the rotation of gear 20, that is, the rotation of knob 26 should be capable of causing the movement of vertical adjustment member 25 toward and away from the longitudinal axis of the pipe section joint without any rotation of gear 20. The purpose of the head vertical adjustment knob 26 is to allow the operator to control and adjust the range of movement of the cutting head of the apparatus with respect to the longitudinal axis of the pipe section, that is, to provide the operator with any easy manual adjustment that he can make to compensate for differences in the widths of the shoulders of the various pipe sections which the apparatus of this invention may be designed to reface. A movable sliding plate 16 may be provided under worm gear 21 to enable disengagement of gear 20 from worm gear 21 whenever control knob 26 is to be used manually to control the range of movement of the cutting head 27 across the shoulders of the section joints. Disengaging lever 29 is used to change the two gears from the engaged position to the disengaged position, and vice versa, as illustrated in FIGS. 1, 2 and 6.

The means for positioning the shoulders of the pipe section joints to be refaced with respect to the plane of the face of the cutting head include a set of truing up plates 7A and 7B, which are mounted on support housing 6 in a manner such that they are easily movable toward and away from the center of the apparatus. (See FIG. 6). For this purpose the plates 7A and 7B are provided with slots 71 through which wing bolts 70 thread into support housing 6. In the preferred embodiment, truing up plates 7A and 7B, are so sized and shaped as to be mirror images of each other, and are symmetrically mounted on support housing 6 so as to form a rectangular aperture within the center of the apparatus as they move across the length of their slots toward and away from each other. The truing up gears, or plates, should be mounted on the same plane with respect to each other as well as with respect to the face of the cutting head. For convenience, they may be mounted on a flat surface of support housing 6, as illustrated in FIGS. 1 and 2. Two plates are preferred, but more or less may also be used. If only one plate is used, an opening, in addition to the plate slot, would be provided on the plate to allow it to stop the pipe section shoulder from moving across the apparatus any further than the plane of the cutting head face. When two plates are used, as illustrated in FIG. 6, the innermost portions of the plates accomplish this purpose.

Figure 10:
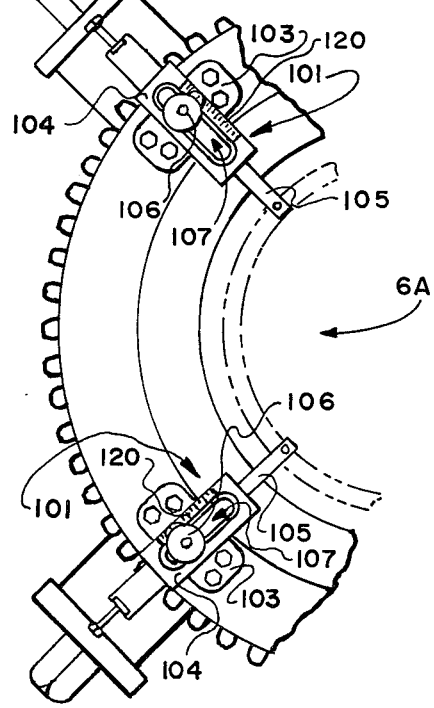
FIG. 10 is a partially broken rear view of the apparatus of the present invention with the alternative embodiment of the truing up gauges attached.
Figure 9:
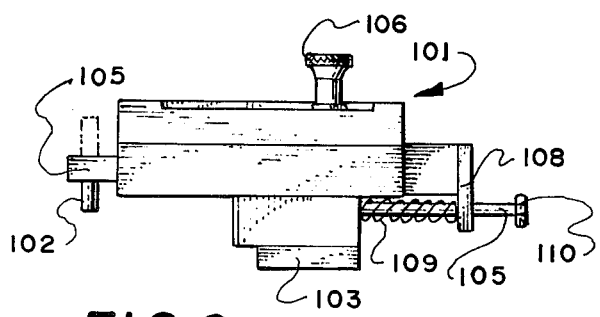
FIG. 9 is an elevation view of an alternative embodiment truing up gauge of the present invention.

FIGS. 9 and 10 illustrate an alternative means for "truing up" pipe joint 90. Preferably four truing up arms 101 are attached by brackets 103 to ring gear 4 using bolts or the like. Arms 101 are preferably mounted so that their longitudinal axis is coincident with radius of ring gear 4, placing pins 102 at aperature 6A. Truing up arm housing 104 is rigidly affixed to bracket 103. Guage arm 105, which is slidably mounted in housing 104 has an ell shaped pin 102 capable of grasping the edge of joint 90. Guage arm 105 can be fixedly set in housing 104 by tightening adjusting knob 106. Knob 106 threadably engages a threaded stud extension of guage arm 105 protruding through elongated slot 107 of housing 104.

The outermost portion of guage arm 105 is slidably braced by guide 108 of housing 104. The outer tip of guage arm 105 has handle 110 for operation by the user. Spring 109 is slidably mounted on guage arm 105 between guide 108 and bracket 103. With this configuration, guage arm 105 is urged away from the center of aperture 6A. To "true up" a pipe joint, pressure is applied to each handle 110 of truing up arms 101 forcing guage arm inward. Pins 102 are hooked on the inner bore of pipe joint 90. Springs 109 hold the pins and attached guage arms in this position. Guage marks 120 are provided adjacent slots 107 on each truing up arm. The operator then "centers" the pipe joint in the apparatus 1 by moving the joint until all four truing up arms have the same measurement. Then knobs 106 are rotated in a clockwise direction to "set" the guage arm in the appropriate position so that jaws 3A–3D can secure pipe 90 for desired refacing operations.

Jaws 3A–3D of the apparatus of the present invention are illustrated in FIGS. 1, 2, 5 and 6. At least two jaws are necessary, and preferably four are used. More or less than four jaws may be used, however, without departing from the concept of the invention. Each jaw includes a jaw drive member 32, which is slidably mounted within jaw housing 33 so as to allow the drive member to move toward and away from the center of the apparatus, as illustrated by the arrows in FIG. 5. Preferably, a curved jaw foot 30 is attached to jaw drive member 32 to facilitate securing the pipe joint to be refaced. Jaw drive bolt 31 is provided in each jaw unit. Jaw drive bolt 31 is threadedly mounted inside jaw housing 33, and attaches to drive member 32. Drive member 32, then, moves along the longitudinal axis of jaw housing 33 as jaw drive bolt 31 is rotated, for example, by hand.

OPERATION

In operating the apparatus of this invention, jaws 3A-3D are first moved outward from the center of the apparatus to accommodate the outer diameter of the pipe section to be refaced. Wing bolts 70 of truing up plates 7A and 7B are then loosened, and plates 7A and 7B moved across their slots and set so that they will impede the movement of the shoulder of the section joint to be refaced at the cutting head face plane. Pipe section 90 is then slipped inside the apparatus until its shoulder touches the innermost extending portions of plates 7A and 7B. When the shoulder to be refaced 91a is that of a joint box end 9a, as illustrated in FIG. 3, the setting of plates 7A and 7B to prevent the shoulder from moving past the plane of the face of cutting head 27 is less critical than when the shoulder to be refaced 91b is that of a joint pin end 9b. In setting the truing up gears to reface a pin and 9b a visual determination of the distance that the plates 7A and 7B have to move across their slots can be made from a knowledge of the outer diameter of the pipe joint to be refaced and a familiarity with the size and configuration of truing up plates 7A and 7B. The surface of the plates 7A and 7B may be calibrated, for example, in conventional pipe O.D. units across their slots so as to enable the operator to simply match the position in each slot with the corresponding O.D. of the pipe section to be repaired. Preferably, truing up plates 7A and 7B are so mounted with respect to the plane of the face of the cutting head of the apparatus as to enable positioning of the shoulders of the joint to be refaced within about 1/16 of an inch from the cutting head face.

After pipe section 90 is positioned by means of the truing up plates the jaw drive members 32 are moved toward the longitudinal axis of the pipe joint so as to center the joint with respect to ring gear 4. The jaw feet 30 should make a snug fit around the joint section. After centering pipe section 90, wing bolts 70 are loosened and plates 7A and 7B returned to their original outward position. At this point it may be desirable to retighten jaw drive bolts 31. With gear disengaging lever 29 in the disengaged position, head vertical adjusting knob 26 is then rotated to adjust the range of movement of the cutting head 27 to the desired value. Lever 29 is then moved to the engaged position. With reversible drill electric motor 8 connected to drive gear shaft 52, the motor is started. Rotation of drive gear shaft 52 totates drive gear 50, which in turn moves ring gear 4. The cutting head 27 then moves cutting element 24 along the circumference of the shoulder to be refaced and, at the same time, across the width of said shoulder as a result of the effect of weight drive 23 on worm gear 21 and vertical control gear 20, as ring gear 4 rotates in either direction. An adjustment of the exact position of cutting element 24 with respect to the face of the shoulder can be made either before or after the motor is started by rotating adjusting knob 28 as already explained.

The ability of the cutting head to move across the width of the shoulder as it rotates around the circumference of the joint end makes it possible for an operator to effectively reface all of the surface of the shoulder simultaneously, and with only one cutting element. Of course, more than one cutting element may be employed if desired, but only one is needed. The elements themselves need not be of any special kind or design, but may comprise any number of replaceable cutting elements, or "cutting tools", usually consisting of a detachable solid block base and a cutting surface, mounted on the base by means of an arm and socket, or similar mechanism. Such cutting elements are widely known to those skilled in the art, and are described in more detail in, for example, U.S. Pat. No. 3,717,055 and No. 3,124,024.

In addition, the operation of the set of jaws 3A-3D provided by this invention enables the operator to accomodate almost any size and shape of pipe sections for refacing without having to use threaded adaptors and, in fact, without having to use any threads at all in the operation of securing the pipe sections. Furthermore, the operator need not be concerned with minor deformities or changes in the circumference of the pipe section joints, which sometimes occur when, for example, pipe sections remain stacked for a considerable length of time, as for shipping, storage, etc., and which often makes it impossible to mate the pipe sections with those refacing machines that depend on the use of threaded connections for mating. Since jaws 3A-3D secure the pipe sections from their outside surfaces, the apparatus of the present invention also avoids the possibility of damage to the threads of the sections as a result of having to screw and unscrew whole sections to threaded adaptors which have never mated before with the particular threads of these sections.

Figure 7:
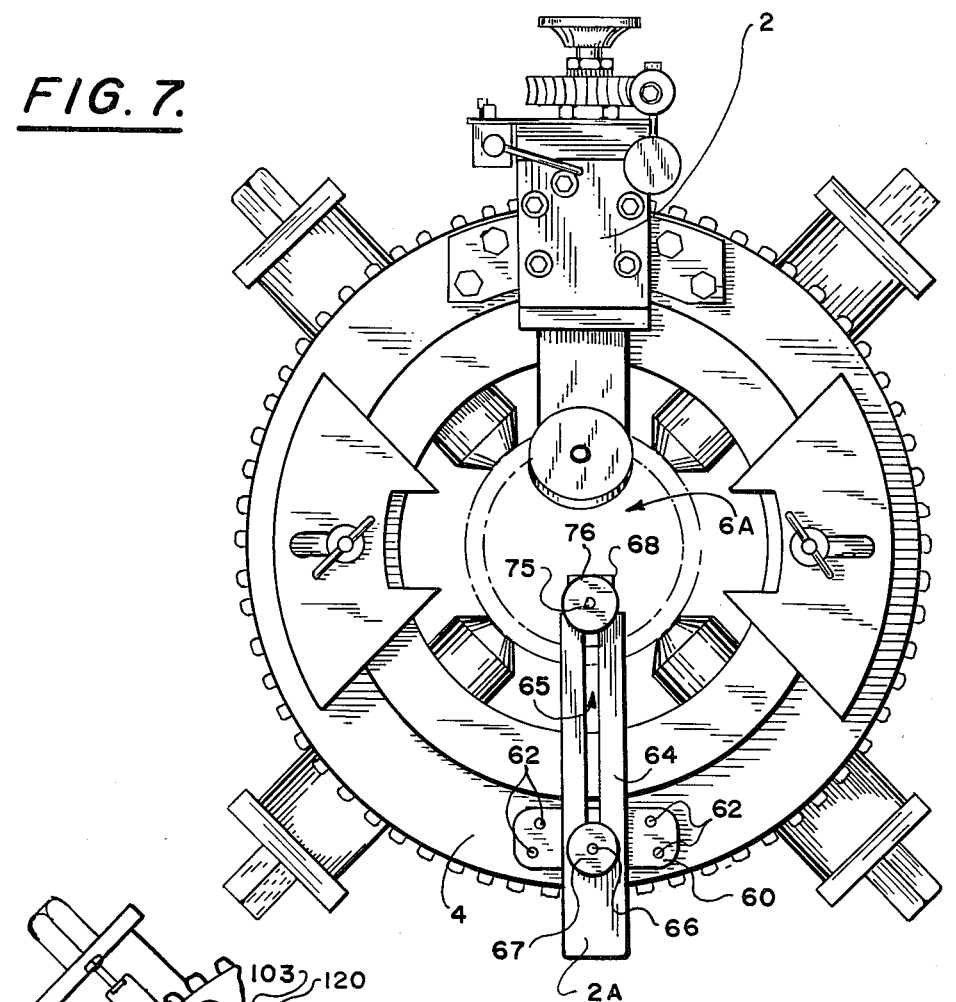
FIG. 7 is a front view of the preferred embodiment of the apparatus of the present invention with the beveling tool attached.
Figure 8:
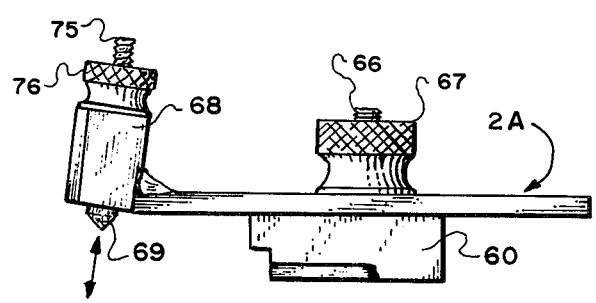
FIG. 8 is a side view of the beveling tool of the apparatus of the present invention.

As can best be seen by FIGS. 7-8, the beveling tool 2A can be mounted on ring gear 4 opposite refacing tool 2. Beveling tool 2A can be attached at bracket 60 to ring gear 4 using bolts 62. Beveling tool 2A has an elongated arm 64 provided with a central slot 65. Threaded stud 66 protrudes from bracket 60 in which it is threadably mounted. Set bolt 67 is threadably mounted on stud 66. With this arrangement, bevel head 68 can be adjustably located with respect to the center of aperature 6A. In addition, bevel 69 is adjustably mounted in bevel head 68 (see arrow, FIG. 8), using a threaded extension 75 of bevel 69. Opposite rotations of adjusting knob 76 on extension 75 will alternatively protrude or retract bevel 69 in bevel housing 68.

Thus, bevel cuts of any desired depth can be made as needed along any part of pipe joint shoulders 91a, 91b. If desired, linear measurements, in preferably in inches or millimeters can be placed on arm 64 adjacent slot 65 to assist in correctly placing bevel cuts on pipe joint 90.

As can be seen, the apparatus of the present invention is a ligthweight, portable machine that may be carried to the job site and which, in addition, does not require that whole pipe sections be made to rotate inside the machine in order to be refaced, as some of the prior art machines call for. Rather, the sections to be refaced by the apparatus of this invention are held in place by the operation of the set of jaws while the cutting head simultaneously moves across and around the shoulders. Thus, the apparatus provides both the means for maintaining the pipe section still for refacing and the means for rotating the cutting element that does the actual refacing.

Although the invention has been described in terms of a particularly preferred embodiment which represents the best mode of the invention known to the applicant at the time of this application, it will be apparent to those skilled in the art that various modifications might be made in the structures herein described, without departing from the scope of the invention which is defined in the appended claims.

What is claimed is:

1. A portable apparatus for refacing pipe section joints, and the like, without the need of threaded adaptors, comprising:

a support housing;

a set of four movable members, telescopically mounted on said support housing at substantially equal distances from each other, and adapted to detachably secure a pipe section from the outer surface of the pipe section;

a first ring gear, rotably mounted on said support housing;

a cutting head, provided with one cutting element, and connected to said first ring gear by means comprising a casing, mounted on said first ring gear, a shaft, connected to said cutting head and telescopically mounted within said casing, a second ring gear, connected to said shaft so as to cause said shaft to move perpendicularly to the longitudinal axis of said second ring gear as said second ring gear rotates, a worm gear, engaged to said second ring gear, and a weight, rotably connected to the shaft of said worm gear;

two symmetrical slotted plates, detachably mounted on one flat surface of said support housing, and provided with inwardly extending protrusions for positioning the joint shoulders of the pipe section within about 1/16 of an inch from the face of said cutting head, and means for imparting rotational motion to said first ring gear comprising a drive gear, engaged to said first ring gear, a drive shaft, connected to said drive gear, and a reversible electric motor.

2. An apparatus for refacing pipe section joints, and the like, comprising:

a support housing;

a plurality of jaws, mounted on said support housing, and adapted to detachably secure a pipe section joint;

a first ring gear, rotatably mounted on said support housing;

a cutting head, provided with at least one cutting element, and connected to said first ring gear by means for moving said cutting head toward and away from the longitudinal axis of the secured pipe section joint when said first ring gear rotates;

a plurality of adjustable arms, slidably mounted on said ring gear, each of said arms provided with tin means on said arms for hooking a portion of the face of the pipe section joint for positioning the shoulders of the pipe section joint within a predetermined distance from the face of said cutting head; and means for imparting rotational movement to said first ring gear.

3. The apparatus of claim 2, further comprising gauge means provided with each of said adjustable arms, for measuring the distance at which each of said adjustable arms extends from said ring gear, to the pipe joint section.

* * * * *